United States Patent
Hendrickson (12) 
(10) Patent No.: US 9,697,495 B1
(45) Date of Patent: Jul. 4, 2017

(54) PROCESSOR-IMPLEMENTED METHOD FOR ESTABLISHING AN EVENT SEQUENCE FOR DELIVERABLES

(75) Inventor: Mark Hendrickson, Evergreen, CO (US)

(73) Assignee: Cognizant TriZetto Software Group, Ltd., Englewood, CO (US)

( * ) Notice: Subject to any disclaimer, the term of this patent is extended or adjusted under 35 U.S.C. 154(b) by 2055 days.

(21) Appl. No.: 12/647,580

(22) Filed: Dec. 28, 2009

(51) Int. Cl.
G06Q 10/00 (2012.01)
G06Q 10/10 (2012.01)
G06Q 10/06 (2012.01)

(52) U.S. Cl.
CPC .......... G06Q 10/10 (2013.01); G06Q 10/06 (2013.01)

(58) Field of Classification Search
USPC .......................................... 705/1.1
See application file for complete search history.

(56) References Cited

U.S. PATENT DOCUMENTS

| 2001/0044738 A1* | 11/2001 | Elkin et al. ................. 705/8 |
| 2005/0289013 A1* | 12/2005 | Goldberg ................... 705/26 |
| 2009/0037875 A1* | 2/2009 | Jones et al. ................ 717/109 |

* cited by examiner

Primary Examiner — Paul R Fisher
(74) Attorney, Agent, or Firm — Dawn-Marie Bey; Bey & Cotropia PLLC (57) ABSTRACT

A processor-driven method provides a step-by-step process to assess an organization's ability to meet project and contract standards resulting from a negotiated contract. This assessment also highlights the most efficient path for performance and identifies strengths and weaknesses in the organizations abilities. The method can aid an organization's front line sale force in identifying resources that are optimal for use in a particular contract and can generate a back end work flow for implementation and tracking of program deliverables by administrators, program or contract managers and others based on the requirements of a negotiated project. The identification of key project phases and solutions and the ability to build process flows based on a library of the organization's operational information, e.g., resources, tools, artifacts, within intersections of the phases and solutions, allows an organization to determine best path to contract completion. The best path may optimize cost, time, and personnel.

8 Claims, 7 Drawing Sheets

PROCESSOR-IMPLEMENTED METHOD FOR ESTABLISHING AN EVENT SEQUENCE FOR DELIVERABLES

BACKGROUND OF THE INVENTION

Field of the Invention

The present invention is directed to a processor-implemented method for establishing a delivery framework. More particularly, the present invention describes a method for visually and logically building and representing stages of a product or service delivery framework, resulting in improved project management from inception to delivery.

Description of Related Art

Event-driven process chains (EPCs) are commonly used for the purpose of enterprise resource planning (ERP) implementation. Numerous commercial applications are available to facilitate the creation of EPC diagrams, including, for example, ARIS Toolset of IDS Scheer AG, ADONIS of BOC Group, Mavim Rules of Mavim BV, Business Process Visual ARCHITECT of Visual Paradigm, Visio of Microsoft Corp., Semtalk of Semtation GmbH, and Bonapart by Pikos GmbH. Generally, these conventional applications are static applications with limited ability to produce flexible, configurable or project-defined process flows. A user models the components of the EPC diagram and create the links between these components. Such a process can be time-consuming and may result in inconsistent processes between two or more implementations of very similar goals.

There is a need in the art for a dynamic framework machine that facilitates the ability to rapidly translate or map the negotiated (or in-process negotiation) contract requirements to the capabilities, resources, tools and other operational abilities of the supplying organization.

SUMMARY OF THE INVENTION

Various embodiments described herein attempt to overcome the drawbacks of the conventional applications. In a first embodiment of the present invention, a process for building a processor-implemented framework machine for facilitating the implementation of contract requirements in view of the resources of a supplier is described. The process includes: establishing a matrix of X phases and Y solutions, wherein an intersection of each X phase with each Y solution is an event sequence link (ESL); populating at least one table stored in at least one database with multiple building blocks for outlining at least one sub process for achieving at least one solution within each ESL; populating each ESL with user selectable building blocks; programming a processor to associate the selection of particular building blocks with particular solutions within each ESL; programming the processor to accept user selection of particular building blocks for achieving the at least one solution within a selected ESL; programming the processor to link user selected building blocks and ESLs into an event sequence chain (ESC); and programming the processor to generate one or more user selected reports based on the ESC which include information directed to at least one of costs, timing, and resources associated with one or more of the user selected building blocks, each ESL and the ESC.

In a second embodiment of the present invention, a processor-implemented method for using a framework machine to map negotiated contract requirements to the resources of a provider is described. The method includes: selecting via a processor a first event sequence link (ESL) from a matrix of event sequence links that approximately maps to a first overlapping phase and solution requirement of a contract; selecting via the processor one or more building blocks within the selected first event sequence link (ESL) that more particularly map to achievement of the first overlapping phase and solution requirement of the contract; repeating selections via the processor of additional ESLs and corresponding building blocks for additional overlapping phase and solution requirements of the contract until each negotiated contract requirement has been mapped to at least one ESL; generating via the processor an event sequence chain (ESC) linking the first ESL and all additional ESLs for each phase; generating via the processor at least one report relating to at least one of the ESC, the first or additional ESLs, the selected building blocks.

In a third embodiment of the present invention, a processor-implemented method for using a framework machine to negotiate contract requirements is described. The method includes: searching via a processor for at least a first building block for satisfying a first proposed contract requirement; if the processor identifies the at least a first building block, then selecting via a processor the at least a first building block; and selecting an event sequence link (ESL) from a matrix of event sequence links that includes the at least a first building block; repeating searching for and selections via the processor of additional building blocks and corresponding ESLs for all proposed contract requirements; generating via the processor an event sequence chain (ESC) linking selected ESLs; and generating via the processor at least one report relating to at least one of the ESC, the selected ESLs, and the selected building blocks.

Additional features and advantages of an embodiment will be set forth in the description which follows, and in part will be apparent from the description, or may be learned by practice of the invention. The objectives and other advantages of the invention will be realized and attained by the structure particularly pointed out in the exemplary embodiments in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE FIGURES

The following figures are intended to be non-limiting diagrammatic examples of the embodiments of the present invention and are included as part of the specification.

DETAILED DESCRIPTION OF THE PREFERRED EMBODIMENTS OF THE INVENTION

Reference will now be made in detail to the preferred embodiments of the present invention, examples of which are illustrated in the accompanying drawings.

Embodiments herein describe a processor-drive method that provides a step-by-step process to, among other things, assess an organization's ability to meet project and contract standards resulting from a negotiated contract. This assessment also highlights the most efficient path for performance and identifies strengths and weaknesses in the organizations abilities. In negotiating a contract to provide customized products and/or services, both the provider and the customer go through numerous iterations and discuss numerous potential product solutions, capabilities, personnel, time tables, costs, and the like. The processor-driven method described herein can aid an organization's front line sale force in identifying resources that are optimal for use in a particular contract and is also capable of generating a back end work flow for implementation and tracking of program deliverables by administrators, program or contract managers, and others based on the requirements of a negotiated project. The identification of key project phases and solutions and the ability to build process flows based on a library of the organization's operational information, e.g., resources, tools, artifacts, within intersections of the phases and solutions, allows an organization to determine best path to contract completion. The best path may optimize cost, time, personnel, etc.

Figure 1:
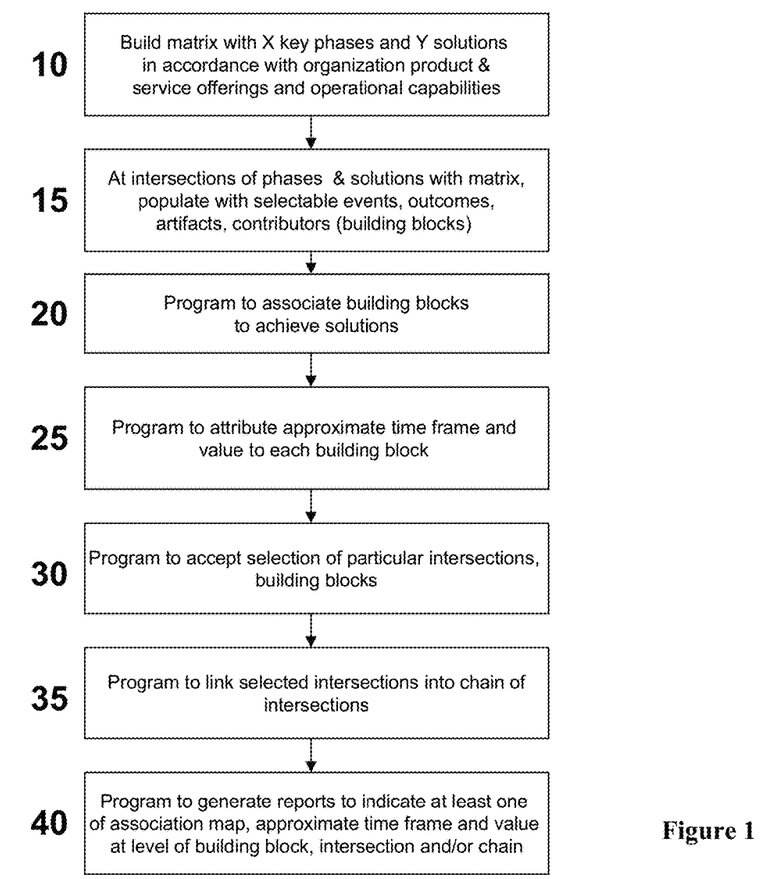
FIG. 1 is a flowchart illustrating the high level process for the development of the framework machine according to a preferred embodiment of the present invention.

The method is described in at lease two phases. First, there is a process for building the framework machine and, second, there are numerous iterations and processes for using the framework machine. Referring to FIG. 1, a first step in building the framework is to establish a matrix of key phases and solutions in accordance with the organization's product and service offerings, operational abilities, and the like 10. Next, at each intersection of the matrix (described herein as event sequence links (ESLs)), there will be building blocks for outlining a process for achieving the solution within the phase at the selected intersection. Such building blocks can include selectable events, outcomes, artifacts, contributors (discussed in more detail herein). Accordingly, at step 15, the matrix is populated with said selectable events, outcomes, artifacts and contributors. Again, these building blocks will be unique to an organization's business, though overlap from business to business on certain points is to be expected. The framework machine is programmed to associate building blocks to achieve certain solutions 20 and to attribute particular time frame requirements or estimates as well as values to individual building blocks 25. The framework machine is programmed to accept selection by a user of particular matrix intersections and building blocks, based on the negotiated (or currently being negotiated) customer requests 30. The framework machine is programmed to link the selected intersections into a chain of intersections (links) (described herein as event sequence chains (ESCs)) 35. And the framework machine is programmed to allow for the selection and generation of various reports that include information at the building block, intersection (link) and chain levels of granularity 40. The information can include, but is not limited to: value which could be presented as cost for customer or approximate cost margin/revenue for organization or some other value calculation; time line to completion, e.g., project schedule; resource allocation estimates, e.g., number of employees; statement of work.

The process for building and programming the framework can be achieved via original coding and database population, use of commercial or other proprietary coding tools or a combination of original and existing tools for automated framework development. The particular programming tools used in the development of the implementing code are outside the literal scope of the invention, but one skilled in the art appreciates that such tools are widely known and available and this knowledge is incorporated into this description.

Figure 2:
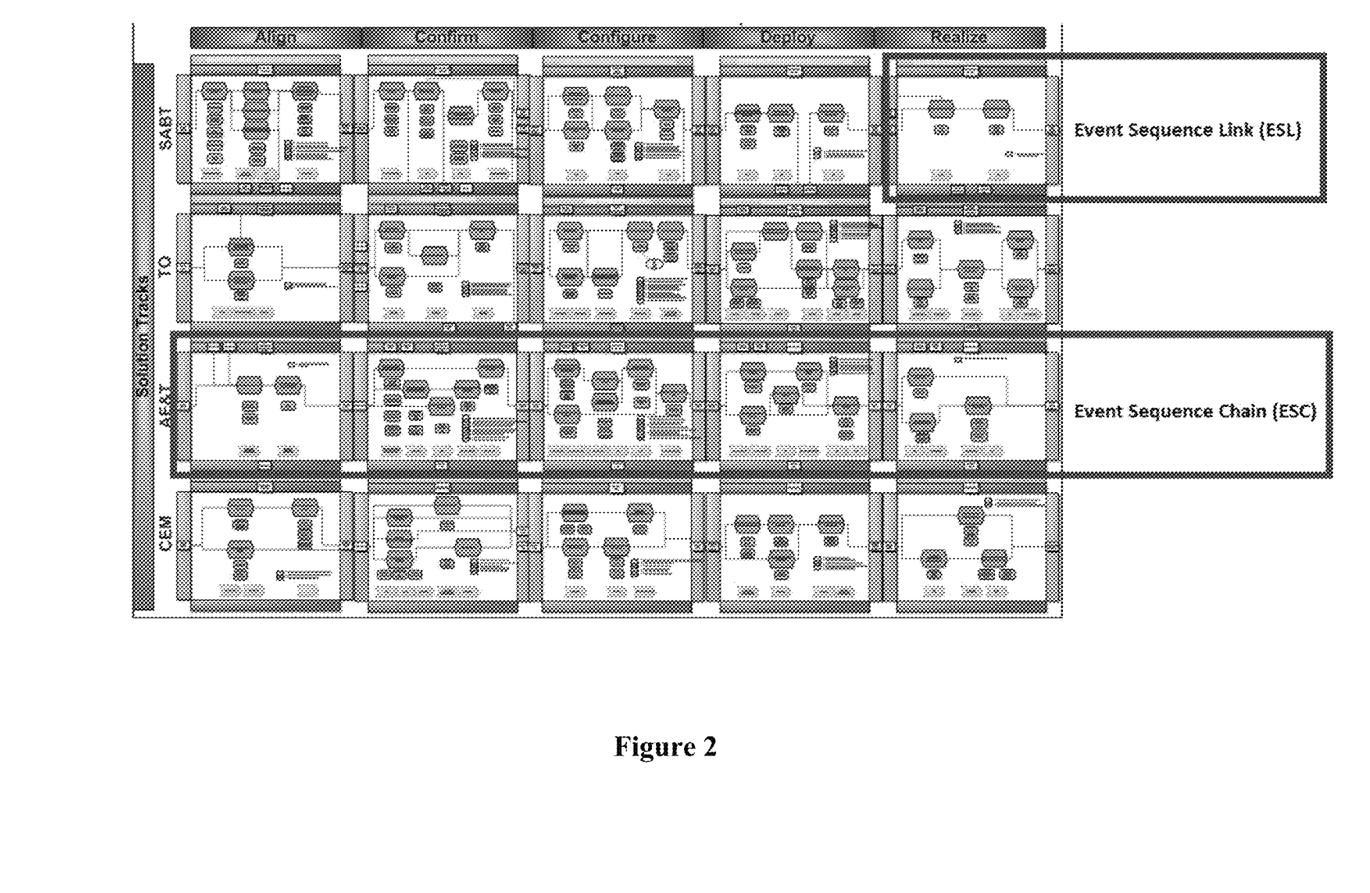
FIG. 2 is an exemplary matrix of phases versus solutions according to a preferred embodiment of the present invention.

In a specific exemplary embodiment of the present invention, the processor-driven method for constructing a delivery framework consists of a predetermined number of phases, e.g., five, and a predetermined number of solution tracks, e.g., four, and can be illustrated in a matrix such as that shown in FIG. 2. Phases represent the stages within the methodology that identify key milestones for a particular business. For purposes of this particular exemplary embodiment, the phases include: 'Align' expectations and develop a comprehensive statement of work; 'Confirm' healthcare transformation approach across all areas; 'Configure' the solution and healthcare transformation element; 'Deploy' the solution, all environments and align processes; and 'Realize' the benefits and continuously improve operations. Solution tracks are created from a strategic perspective in order to provide structure to the new methodology, allow for new client offerings and to create a unified methodology for all of a businesses products and services. For purposes of this exemplary embodiment, the solution tracks include: Strategy Acceleration & Business Transformation (SABT)—the strategic alignment of people, processes and technology within an organization in order to meet long-term goals; Technology & Operations (TO)—the environmental tools and procedures necessary in order to deliver the desired product or service; Application Enablement & Testing (AET)—the complete future-state delivery of a product or service; and Change & Education Management (CEM)—the processes and tools needed in order to effectively implement new methods and systems across an organization in order to promote ownership. For the sake of completeness, this particular implementation anticipates a fifth solution track (not shown) which is referred to as Delivery Leadership (DL)—the project management track that is accountable for the overall coordination and integration of project activities. Although the exemplary embodiment includes five phases and four (or five) solution tracks, it is intended that the method can be implemented using any number of phases and solutions tracks. Additionally, it is intended that the phases and solution tracks can have other purposes and functions besides those described in this exemplary embodiment.

At the intersection of each phase and solution track is an event sequence link ("ESL"), which is comprised of combinations of the following building blocks: Event—an event describes the "what," can have one-to-many outcomes associated with it, and are named with a verb/noun definition in mind (actionable); Outcome—an outcome describes the "why" and is the tangible result(s) that add value to our customers; Artifacts—an artifact depicts the "how" and are the deliverables that drive to the business outcome(s); Contributor—the contributor represents the "who" and are potential people, processes and systems that enable events to produce outcomes; and, finally, Associations—associations define a potential relationship, are non prescriptive relationships between events and sequence mapping and are not required, but instead are a guide for a potential client solution path.

Figure 3:
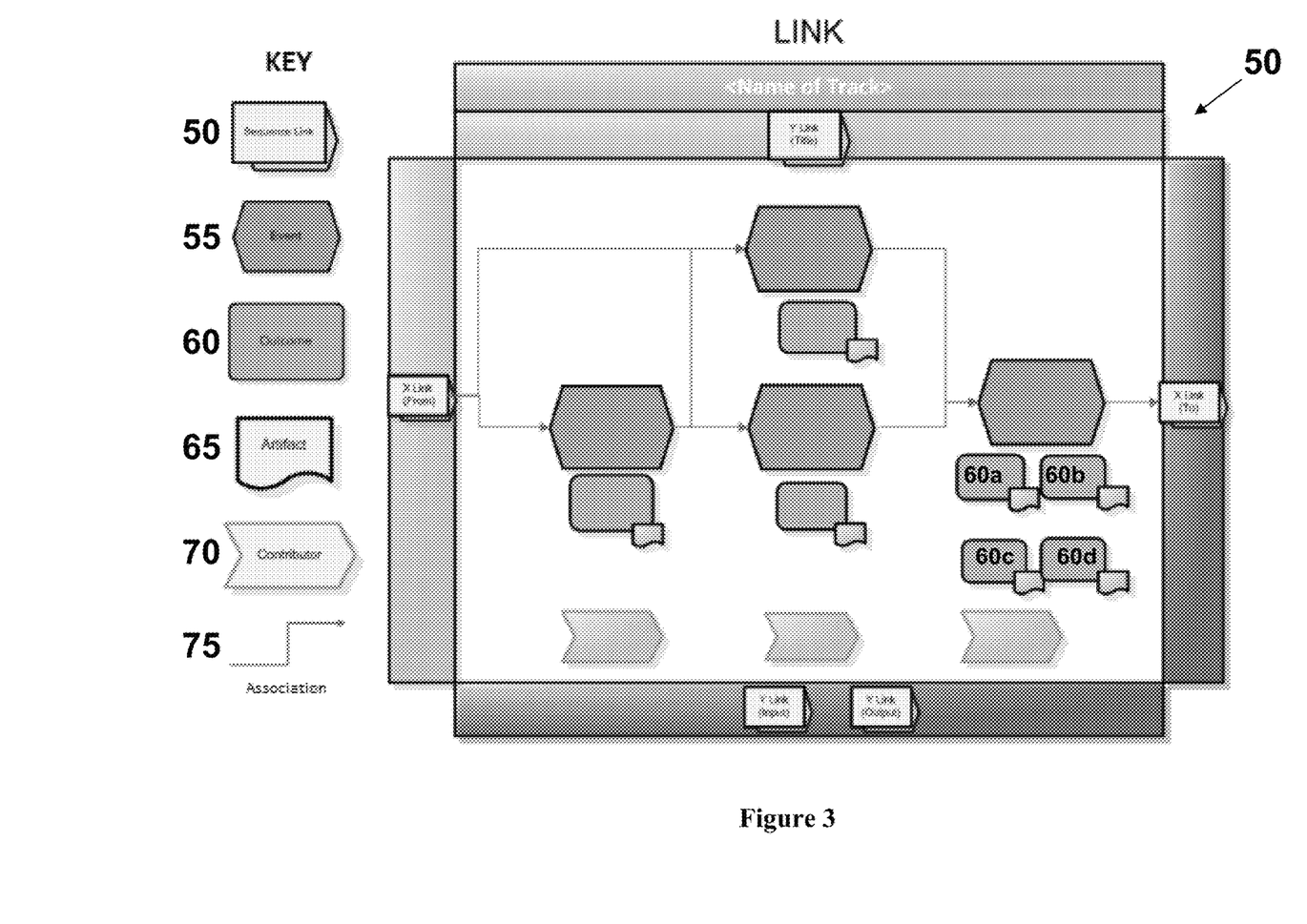
FIG. 3 is an exemplary Event Sequence Link (ESL) diagram according to a preferred embodiment of the present invention.

More specifically, FIG. 3 illustrates how these various building blocks could be depicted at a specific ESL 50. An event 55 is a series of process activities or events that occur within a construct named after the result or the outcome of the final event. So an event may encapsulate several events or just one event. The events within the solution tracks can be delivered within one solution track or it may cross multiple solution tracks. An event is tied to an outcome 60. So the event 55 essentially describes what is being done when performing certain activities and the outcome 60 really defines why. Accordingly, one event 55 could have one or many outcomes 60. For example, in FIG. 3, event 55d has four outcomes 60a-60d. The outcomes 60 show a client the result and the value of performing activities within the given event. Next, artifacts 65 are tied to outcome. An outcome 60 could have zero or many artifacts attached thereto. The artifacts 65 are specific tools that are used to perform the events 55 necessary to produce the set of outcomes 60. Accordingly, the artifacts 65 are the how. So if the event 55 tells what is being done, the outcomes 60 say why it is being done and what the result is. And the artifacts 65 tell you how you produce the outcome 60. Exemplary artifacts 65 might include examples like check lists, architecture diagrams, master test plans, etc. Artifacts 65 are concrete deliverables that can and often will be shared with customer during a project implementation. The contributor symbol 70 lies at the bottom of the ESL diagram and is aligned with the events 55 and outcomes 60 in artifacts 65 to depict the entity that moves that work along. The general category for a contributor could be a group, a person, a role, or it could be a tool. All of those examples help move the work through these events in an overall system that provides the results and the outcomes that were aligned when entering into an agreement with our customer. Finally, there are association arrows 75 that connect the other building blocks. The association arrows do not depict a particular or a specific predecessor, successor relationship, but are intended to show a potential relationship between the events such that a customer and a project implementation manager or team at the organization understands the potential or possible series of events that could occur within in ESL.

Figure 4:
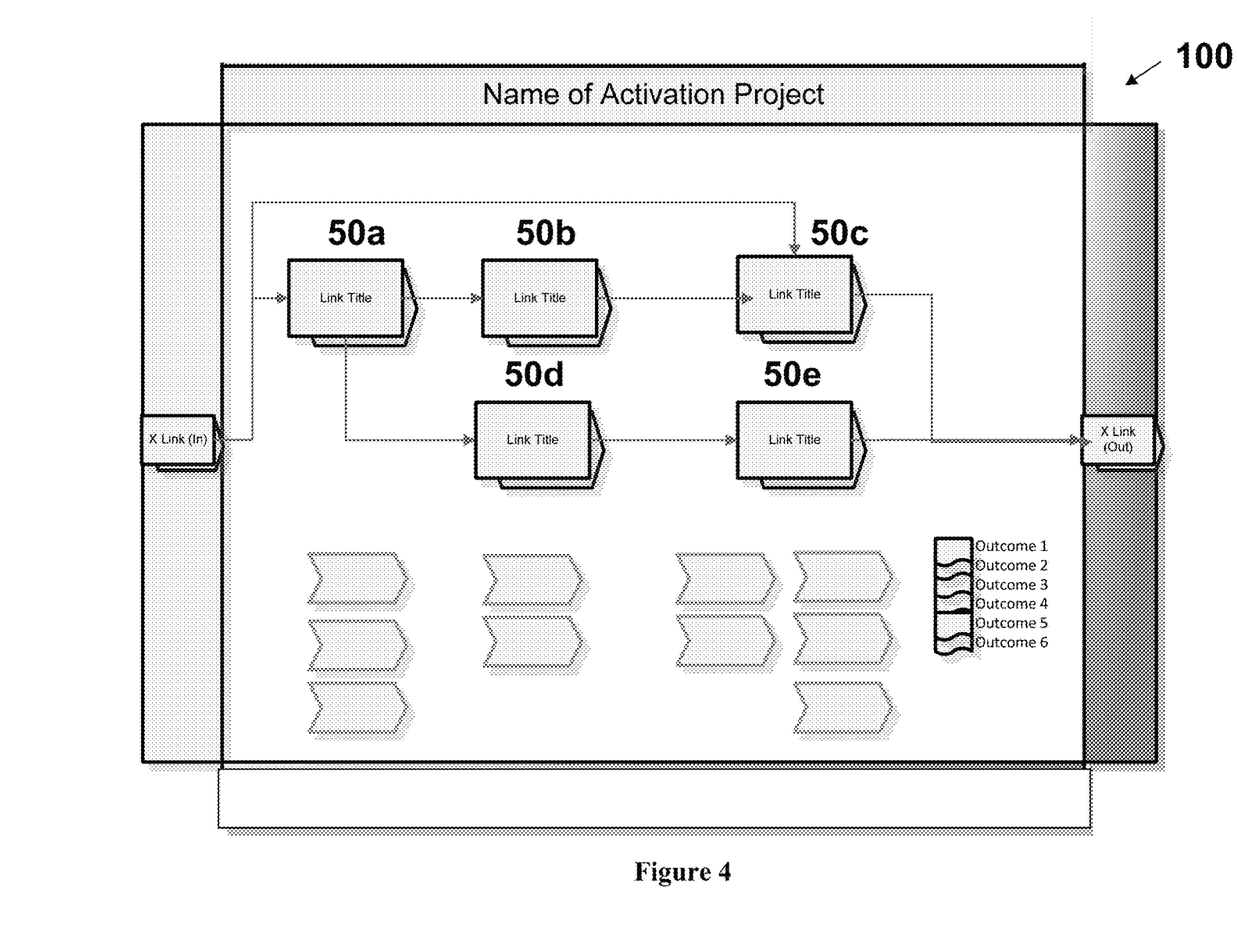
FIG. 4 is an exemplary Event Sequence Chain (ESC) diagram according to a preferred embodiment of the present invention.

Next, an ESL, either alone or in combination with other ESLs, forms an Event Sequence Chain (ESC) 100 as exemplified in FIG. 4. The Events Sequence Chain is the linkage of ESLs; which in this particular example are shown as 50a-50e. The ESC is a diagrammatic output of the operational solution that the organization will apply against the requirements of the negotiated contract. The ESC represents a translated contract agreement mapped to the capabilities and resources of the provider organization.

The framework machine may provide the following functionality: generate an ESC Diagram for each ESL inputted into the system; take all inputted ESLs and create and ESC list; print a generated ESC List; name a generated ESC List; save a generated ESC List; generate an ESC Diagram from all inputted ESLs; print an ESL Diagram; print a generated ESC Diagram; name a generated ESC Diagram; save a generated ESC Diagram; access a saved ESC and update it; and version ESCs. Further, the system shall provide the ability to deselect at least the following to exclude it from an ESC and/or ESL: Events and Artifacts.

The framework machine may also calculate: an estimated cost based upon events and artifacts; a profitability score for each ESC; typical total contributor load by contributor; typical total contributor load; total rough order of magnitude (ROM); total ROM variance; total cost; total cost variance; total contributor variance by contributor; total contributor variance. Other framework machine functionality includes: identification of gaps that exist between the selected ESLs and the desired work to be completed; identification of owners of each ESL that exists in a chain, including offering organization and third parties, e.g., subcontractors; identification of areas where one owner owes another owner an artifact; identification of which ESL that artifact should be delivered from one owner to the other.

In a particular implementation, the framework machine may generate a template such as a .mpp file that includes: ESL Name, Event Name and Artifact Name. The template may contain the following information associated with an event and/or an artifact: Rough order of Magnitude (ROM); ROM Variance; Contributors; Contributor Load; Cost; and Cost Variance. Further, the template may contain the following information associated with an artifact.

With respect to events, the framework machine may generate an event list from the generated ESC that is comprised of ESLs. The event list can be viewed, printed, named, and/or saved by ESC or ESL. Event attributes and events attribute values can be assigned as follows: ROM in Hours; ROM Variance in Hours; Contributors (e.g., Primary Owner; Project Performer; Manager); Contributor Load in Hours; Cost in Dollars; Cost Variance in Dollars.

With respect to outcomes, the framework machine may generate an outcome list from the generated ESC which can be viewed, printed, named and/or saved by ESC or ESL or event.

With respect to artifacts, the framework machine may generate an artifact list from the generated ESC. The artifact list, including all attributes and attribute values assigned can be viewed, printed, named, and/or saved by ESC or ESL or event or outcome. The framework machine has the ability to generate a collection of Artifact templates. A user has the ability to designate where the artifact template collection will be deposited. Further, the framework machine has the ability to assign artifacts attributes and attributes values to all attributes associated to an artifact including: Rough order of Magnitude (ROM); ROM Variance; Contributors; Contributor Load; Cost; and Cost Variance. The ROM and ROM variance is calculated for an ESC based upon the artifacts included in the ESC and may be viewed by ESC or ESL or event or artifact. The contributor list and contributor load is calculated for an ESC based upon the artifacts included in the ESC and may be viewed by ESC or ESL or event or artifact.

Figure 5:
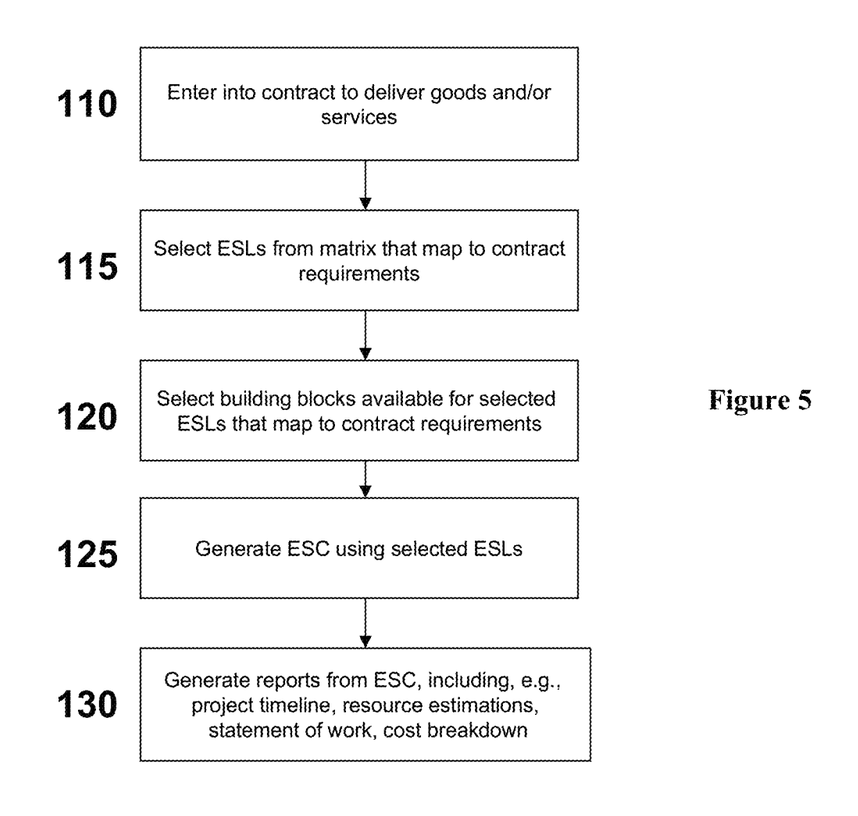
FIG. 5 is flowchart illustrating a first process for using the framework machine according to a preferred embodiment of the present invention.

Thus far, the development of the framework machine and specific example have been described. In FIG. 5, the flow of an exemplary processor-implemented method for using the framework machine is depicted. Specifically, in a first embodiment, a negotiated contract to provide products and/or services has been negotiated 110. The negotiated contract includes numerous requirements that will draw upon various capabilities and resources of the firm for a negotiated cost and expected delivery time line. In accordance with the requirements, a user selects ESLs that map to requirements of the contract 115. Within the ESLs, the user can further select appropriate building blocks to meet required solutions 120. The building block data is stored in a library, e.g., database table(s), and can be searchable and/or listed for point and click selection via a drop down menu or the like.

Alternatively, the user could identify required building blocks first, which would in turn fall within specific ESLs within the matrix. Once the ESLs are identified for the negotiated contract requirements, an ESC is generated and includes the identified ESLs 125. From the ESC, the user can generate multiple reports including a statement of work for the negotiated contract, time lines, resource estimates, and value estimates, including cost breakdowns and predicted revenue 130.

The framework machine also offers additional functionality for adding and/or deselecting building blocks and/or ESLs in response to client change orders or contract amendments during the life of the contract. A new ESC may result and updated reports can be run by various users in order to allocate or re-allocate resources accordingly, re-align internal budget, revise customer expectations, etc.

Figure 6:
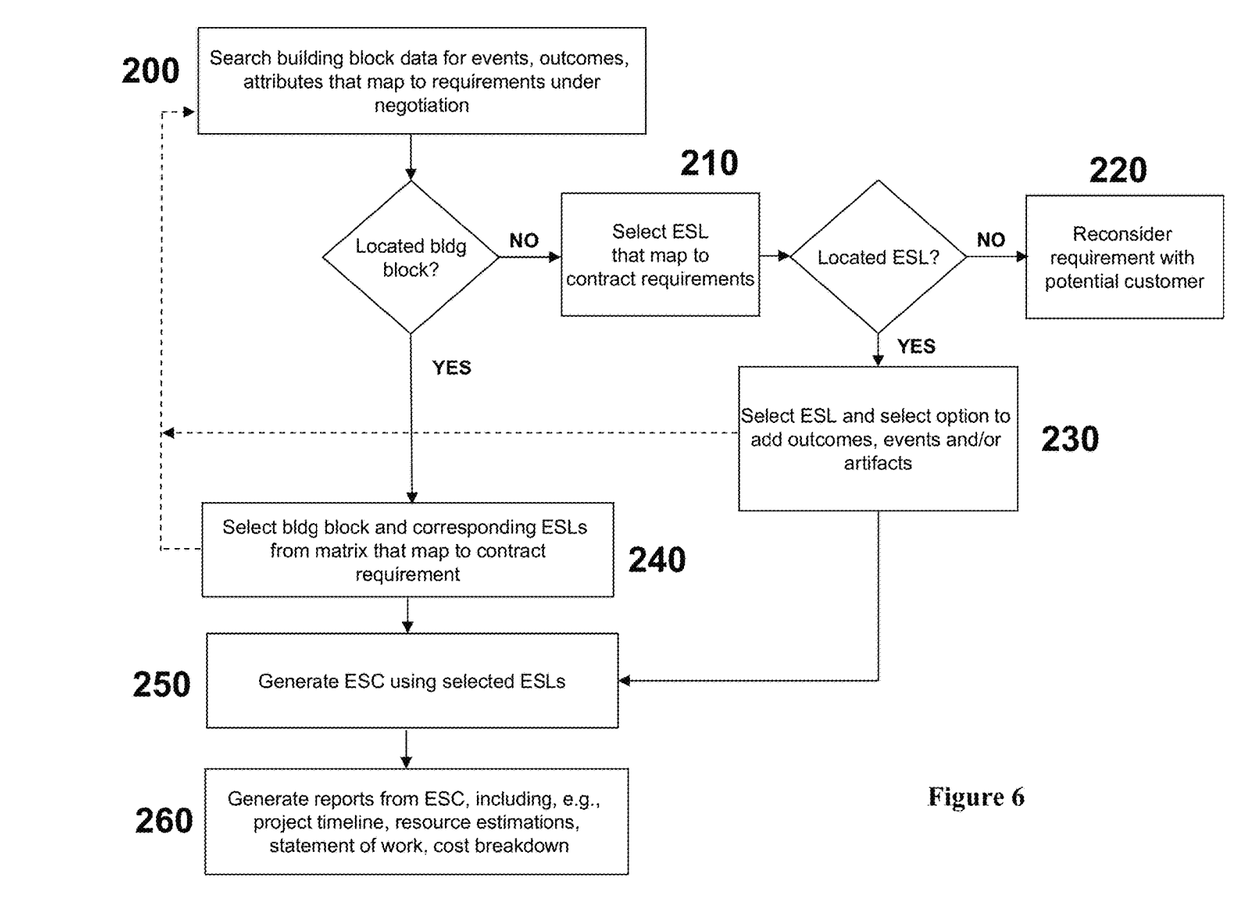
FIG. 6 is flowchart illustrating a second process for using the framework machine according to a preferred embodiment of the present invention.

A second exemplary processor-implemented method for using the framework machine is depicted in FIG. 6. In this second embodiment, the framework machine is utilized during negotiation of the contract. This is just one exemplary negotiation flow, wherein once requirements are identified, the framework machine is searched for corresponding building block data, e.g., events, outcomes, artifacts that would be used to solve the requirement 200. If the particular building block is located, then it is selected, along with the corresponding ESL 240. If the particular building block is not located, then the user attempts to find an ESL category that is in line with the requirement 210. If an appropriate ESL is located, the user selects this ESL and can then select an option to add outcomes, events and/or artifacts that would meet the requirement being negotiated 230. If there is no appropriate ESL located for the requirement, then this requirement may be subject to reconsideration during the negotiation 220 as it may not fall within current operational capabilities of the organization. These steps are repeated for all requirements under negotiation. Once the ESLs and building blocks have been selected, the user can request that the framework machine generate the ESC resulting from the selections 250. And from the ESC, various reports can be run as previously described 260. Since the framework machine can include information about the costs, resource allocation and timing associated with individual building blocks, the selection of particular building blocks over others (or not at all) may be contemplated during negotiations in view of this information due to project costs and time constraints. If the report from a first negotiated ESC contains estimations that are not acceptable, the framework machine is dynamic. The ESLs or individual building blocks within the ESLs can be de-selected and changed in order to bring the contract more in line with the expectations of the parties. Considering this information during negotiations (as compared to post contract signing) mitigates over commitment of resources by the offeror and helps to manage expectations of all parties and optimize.

The ability to generate detailed statements of work with resource identification and estimations will necessarily reduce the amount of time necessary for organization project teams to understand what will and will not work to achieve the contract requirements. The report details what events, what outcomes, what artifacts should be collected in preparation to deliver against that contract. The framework machine acts as an interface for an administrator, program manager, analyst or other managing user to orchestrate what was designed in the contract. Further, the framework is not static as the underlying data tables and associations are continually updated to reflect changes in the organizations capabilities and resources.

The reporting function also offers other features including outlining the requirements that were sold in the contract agreement that do not match a specific or approved event or artifact set to be able to produce that goal. The report results in improvement in product and service delivery quality because the offeror organization will very quickly understand if the sales department has sold something that the organization is not currently competent to provide. This greatly enables the organization to get ahead of a customer engagement and be forthright regarding the possibility of additional cost and time around producing those offerings that the organization does not currently have the capacity to produce. Using both diagrammatic and mechanical solutions, the present invention facilitates the assembly of a bound set of artifacts, tools and attribute information for the organization to better understand and queue up internal resources to develop and deliver a best in class service.

The users interface with the framework machine via a web interface that can be pulled up any where there is network access. The preferred embodiment contemplates multiple versions of the interface offerings. For example, if the machine is being used during contract negotiations, the available building block selections could be a subset of what is ultimately available to organization administrators and program managers. Accordingly, a negotiation interface might be described as less complex and more user friendly so as to establish contract principles at a high level. The ultimate methods for selection of building blocks and ESLs could be implemented through one or more of point and click, drop down menus, check boxes, tags, icons, drag and drop. A second interface might be available to internal organization personnel to fill in with more specific building blocks post-negotiation. This second interface, like the first, could facilitate selection through one or more of point and click, drop down menus, drag and drop.

In a particular embodiment of the present invention, the framework machine provides running information either on the individual web pages or upon request by the user as selections/de-selections are identified. For example, a profitability metric could identify to users how particular selections affect the organizations profitability. Similarly, a cost metric could identify to the potential customer how a particular selection will likely affect cost.

Other anticipated functionality allows for the input and collaboration by and with another customer vendor, e.g., subcontractor or customer-selected third party vendor. For example, during contract negotiations, the customer could submit that it has already hired a third party to complete one or more events, ESLs, phases, solutions, etc. In order to provide the customer with a complete picture of its negotiations and how multiple contracts interact to provide a solution, the framework machine offers the option to input at least minimal third-party contract information for the identified events, ESLs, phases, solutions. Accordingly, the negotiating organization enters third-party cost, time frame, etc. at the appropriate events, ESLs, phases, solutions when prompted by the customer. This information will offer a value-add to the customer who will be able to see a complete ESC that includes at least high level costs and timeline information across multiple vendors and contracts. This information is also important to the offering organization since the ESC and reports will indicate that particular building blocks are being provided by a third party and thus the offering organization will not waste resources on completing an event that it was clearly not hired to complete.

Figure 7:
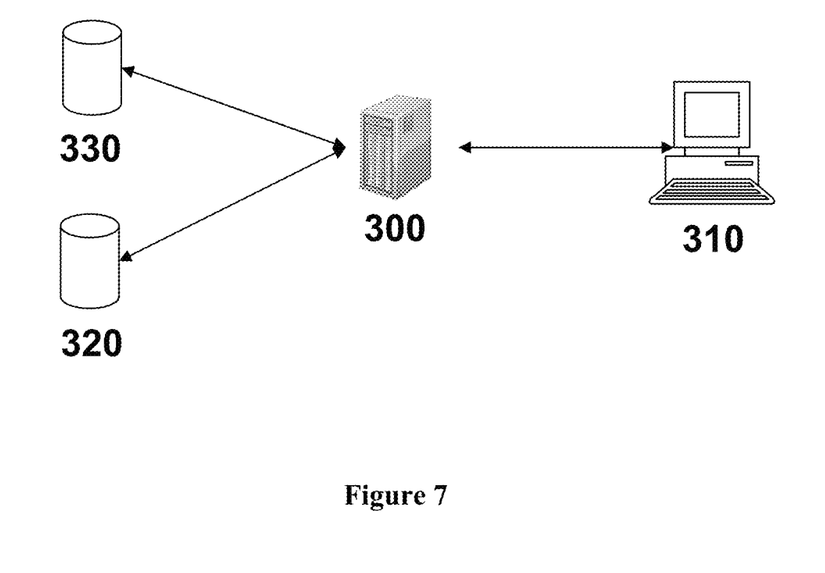
FIG. 7 is a system overview for a framework machine according to a preferred embodiment of the present invention.

As shown in FIG. 7, the framework machine can be embodied on a framework server 300. A workstation computer 310 can allow a user to access the functionality of the framework server 300. Alternatively, the workstation computer 310 and the framework server 300 can be embodied on a single computer. In this embodiment, the workstation computer 310 communicates with the framework server 300 through data transmission lines. These data transmission lines can be implemented in both a LAN, WAN, intranet, internet, or other type of communication network. The framework server 300 is coupled to a database or library 320 of ESLs. The framework server 300 can also be coupled to a database or library 330 of events, outcomes, artifacts, contributors, tools, and/or other resources. Although the exemplary embodiment depicts a separate database 320 from database 330, it is intended that these databases 320, 330 can be embodied in a single database. Alternatively, one or more of these databases can be included in the framework server 300 or the workstation computer 310.

When a user at the workstation computer 310 desires to generate or modify an event-driven process chain, the workstation computer 310 sends requests to the framework server 300. The framework server 300 can recall items from the databases 320, 330, add items to the databases 320, 330, or modify items in the databases 320, 330. The framework server 300 can also provide the reporting functionality to the workstation computer 310.

The framework machine can take the form of an entirely hardware embodiment, an entirely software embodiment, or an embodiment containing both hardware and software elements. In one embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device. The medium can utilize electronic, magnetic, optical, electromagnetic, infrared, or semiconductor system (or apparatus or device) or a propagation medium (though propagation mediums in and of themselves as signal carriers are not included in the definition of physical computer-readable medium). Examples of a physical computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem, and Ethernet cards are just a few of the currently available types of network adapters.

Moreover, the disclosed methods may be readily implemented in software, e.g., as a computer program product having one or more modules each adapted for one or more functions of the software, executed on a programmed general purpose computer, cellular telephone, PDA, a special purpose computer, a microprocessor, or the like. In these instances, the systems and methods of this invention can be implemented as a program embedded on a personal computer such as a JAVA®, CGI or Perl script, as a resource residing on a server or graphics workstation, as a routine embedded in a dedicated image system, or the like. The systems and methods of this invention can also be implemented by physically incorporating this system and method into a software and/or hardware system, such as the hardware and software systems of a computer. Such computer program products and systems can be distributed and employ a client-server architecture.

It is to be appreciated that the various components of the technology can be located at distant portions of a distributed network and/or the Internet, or within a dedicated secure, unsecured and/or encrypted system. Thus, it should be appreciated that the components of the system can be combined into one or more devices or co-located on a particular node of a distributed network, such as a telecommunications network. As will be appreciated from the description, and for reasons of computational efficiency, the components of the system can be arranged at any location within a distributed network without affecting the operation of the system. Moreover, the components could be embedded in a dedicated machine.

Furthermore, it should be appreciated that the various links connecting the elements can be wired or wireless links, or any combination thereof, or any other known or later developed element(s) that is capable of supplying and/or communicating data to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique.

The embodiments described herein are not intended to be limiting. On skilled in the art recognizes the various alternatives to the exemplary embodiments that are necessarily included within the scope of the present invention.

What is claimed is:

1. A process for building a processor-implemented framework machine for facilitating the implementation of contract requirements in view of the resources of a supplier, the process comprising:
   establishing a matrix of X phases and Y solution track, wherein an intersection of each X phase with each Y solution track is an event sequence link (ESL);
   populating at least one table stored in at least one database with multiple building blocks for outlining at least one sub process for achieving at least one solution within each ESL;
   populating each ESL with user selectable building blocks;
   programming a processor to associate the selection of particular building blocks with particular solutions within each ESL;

programming the processor to accept user selection of particular building blocks for achieving the at least one solution within a selected ESL;

programming the processor to link user selected building blocks and ESLs into an event sequence chain (ESC); and programming the processor to generate one or more user selected reports based on the ESC which include information directed to at least one of costs, timing, and resources associated with one or more of the user selected building blocks, each ESL and the ESC.

2. The process according to claim 1, wherein the selectable building blocks include events, outcomes, artifacts, and contributors.

3. The process according to claim 1, wherein the user selectable building blocks are selected from the group consisting of: events, outcomes, artifacts, contributors and associations.

4. The process according to claim 3, further comprising: programming the processor to accept user deselection of one or more of at least one event and at least one artifact from an ESL.

5. The process according to claim 1, wherein the one or more user selected reports is selected from the group consisting of: generation of an ESC Diagram for each ESL inputted into the framework machine and generation of an ESC Diagram from all inputted ESLs.

6. The process according to claim 1, wherein different combinations of multiple building blocks may achieve the same at one solution within an ESL.

7. A process for building a processor-implemented framework machine for facilitating the implementation of contract requirements in view of the resources of a supplier, the process comprising:

establishing a matrix of X phases and Y solution tracks, wherein an intersection of each X phase with each Y solution track is an event sequence link (ESL);

populating at least one table stored in at least one database with multiple building blocks for outlining at least one sub process for achieving at least one solution within each ESL;

populating each ESL with user selectable building blocks;

programming a processor to associate the selection of particular building blocks with particular solutions within each ESL;

programming the processor to accept user selection of particular building blocks for achieving the at least one solution within a selected ESL;

programming the processor to link user selected building blocks and ESLs into an event sequence chain (ESC);

programming the processor to generate one or more user selected reports based on the ESC which include information directed to at least one of costs, timing, and resources associated with one or more of the user selected building blocks, each ESL and the ESC; and programming the processor to accept deselection of one or more building blocks from one or more ESLs and generate an updated user selected report based on the deselection.

8. The process according to claim 7, wherein different combinations of multiple building blocks may achieve the same at least one solution within an ESL.

* * * * *